US010073623B2

(12) United States Patent
You

(10) Patent No.: US 10,073,623 B2
(45) Date of Patent: Sep. 11, 2018

(54) MEMORY SYSTEM AND OPERATION METHOD FOR THE SAME

(71) Applicant: SK hynix Inc., Gyeonggi-do (KR)

(72) Inventor: Byoung-Sung You, Seoul (KR)

(73) Assignee: SK Hynix Inc., Gyeonggi-do (KR)

( * ) Notice: Subject to any disclaimer, the term of this patent is extended or adjusted under 35 U.S.C. 154(b) by 0 days.

(21) Appl. No.: 15/636,756

(22) Filed: Jun. 29, 2017

(65) Prior Publication Data

US 2018/0150224 A1    May 31, 2018

(30) Foreign Application Priority Data

Nov. 29, 2016  (KR) .......................... 10-2016-0159799

(51) Int. Cl.
*G11C 5/06* (2006.01)
*G06F 3/06* (2006.01)
*G06F 13/16* (2006.01)
*G06F 13/18* (2006.01)

(52) U.S. Cl.
CPC ............ *G06F 3/0604* (2013.01); *G06F 3/061* (2013.01); *G06F 3/0659* (2013.01); *G06F 3/0685* (2013.01); *G06F 13/1668* (2013.01); *G06F 13/18* (2013.01)

(58) Field of Classification Search
CPC . G11C 16/08; G11C 11/5628; G11C 11/5642; G11C 16/0483; G11C 16/10; G11C 16/26; G11C 16/34; G11C 16/3418; G11C 16/3427; G11C 16/3459; G11C 7/18; G11C 8/14
See application file for complete search history.

(56) References Cited

U.S. PATENT DOCUMENTS

2012/0314514 A1* 12/2012 Kwon ...................... G11C 7/18
                                                      365/189.09

FOREIGN PATENT DOCUMENTS

KR    1020080030756    4/2008
KR    1020120130588    12/2012

* cited by examiner

*Primary Examiner* — Thong Q Le
(74) *Attorney, Agent, or Firm* — IP&T Group LLP

(57) ABSTRACT

A memory system, may include: a memory device including a plurality of memory blocks each including a plurality of stacked word lines; and a controller suitable for dividing the plurality of word lines into two or more word line groups according to heights thereof, programming data of a relatively high access frequency into a word line group having word lines of relatively low physical heights and data of a relatively low access frequency into a word line group having word lines of relatively high physical heights among the word line groups included in each of the memory blocks.

20 Claims, 15 Drawing Sheets

MEMORY SYSTEM AND OPERATION METHOD FOR THE SAME

CROSS-REFERENCE TO RELATED APPLICATIONS

The present application claims priority of Korean Patent Application No. 10-2016-0159799, filed on Nov. 29, 2016, which is incorporated herein by reference in its entirety.

BACKGROUND

1. Field

Exemplary embodiments of the present invention relate to a memory system, and more particularly, to a memory system including a plurality of physically stacked word lines and a method for operating the same.

2. Description of the Related Art

The computer environment paradigm has changed to ubiquitous computing systems that can be used anytime and anywhere. Due to this, use of portable electronic devices such as mobile phones, digital cameras, and notebook computers has rapidly increased. These portable electronic devices generally use a memory system having one or more memory devices for storing data. A memory system may be used as a main memory or an auxiliary memory of a portable electronic device.

Memory systems provide excellent stability, durability, high information access speed and low power consumption because they have no moving parts. Examples of memory systems having such advantages include universal serial bus (USB) memory devices, memory cards having various interfaces, and solid state drives (SSD).

SUMMARY

Embodiments of the present invention are directed to a memory system capable of programming different kinds of data therein according to the physical positioning such as the physical height of a plurality of physically stacked word lines, and a method for operating the same.

In accordance with an embodiment of the present invention, a memory system, may include: a memory device including a plurality of memory blocks each including a plurality of stacked word lines; and a controller suitable for dividing the plurality of word lines into two or more word line groups according to heights thereof, programming data of a relatively high access frequency into a word line group having word lines of relatively low physical heights and data of a relatively low access frequency into a word line group having word lines of relatively high physical heights among the word line groups included in each of the memory blocks.

The controller may detect an access frequency of data based on a logic address and a data size of the data, and the controller may adjust a number of word lines included in the respective word line groups in each of the memory blocks based on the detected access frequency.

The controller may increase the number of word lines included in the word line groups of the relatively low physical heights and decreases the number of word lines included in the word line groups of the relatively high physical heights among the word line groups in each of the memory blocks.

The controller may decrease the number of word lines included in the word line groups of the relatively low physical heights and increases the number of word lines included in the word line groups of the relatively high physical heights among the word line groups in each of the memory blocks.

The controller divides the plurality of word lines of the respective memory blocks into first to third word line groups, the first word line group may include one or more word lines of lowest physical heights and the controller may store hot data of access frequencies above a first threshold, the third word line group may include one or more word lines of highest physical heights and the controller may store cold data of access frequencies under a second threshold smaller than the first threshold, and the second word line group may include one or more word lines of physical heights between the physical heights of word lines of the first and third word line groups and the controller may store intermediate data of access frequencies between the first and second thresholds.

The controller may store the hot data only in the first group of the respective memory blocks during a program operation, and during a merge operation after the program operation, the controller may merge the stored hot data into a predetermined one among the memory blocks.

The controller may store the hot data in the first group, the intermediate data in the second group, and the cold data in the third group of the respective memory blocks during a program operation, and during a merge operation after the program operation, the controller may merge the stored hot data into a predetermined first memory block, the stored intermediate data into a predetermined second memory block, and the stored cold data into a predetermined third memory block.

When K intermediate data and K+L cold data are applied from the host during a program operation, the controller may store the K intermediate data and K cold data in the second and third groups of K memory blocks and L cold data in the second and third groups of rounded-off L/2 memory blocks among the memory blocks, and during a merge operation after the program operation, the controller may merge the K stored intermediate data into a first memory block and the K+L stored cold data into a predetermined second memory block.

The controller may control the memory system to program the hot data with a first initial program pulse having a lowest voltage level, the cold data with a second initial program pulse having a highest voltage level, and the intermediate data with a third initial program pulse having a voltage level between the first and second initial program pulses.

The data of the relatively high access frequency may include a predetermined number of random data having logic addresses irrelevant to one another and small size data whose size is less than a first size, and the data of the relatively low access frequency may include a predetermined number of sequential data having logic addresses related to one another and big size data whose size is greater than a second size greater than the first size.

In accordance with another embodiment of the present invention, a method for operating a memory system including a memory device including a plurality of memory blocks each including a plurality of stacked word lines, the method may include: detecting an access frequency of data based on a logic address and a data size of the data; dividing the plurality of word lines into two or more word line groups according to heights thereof; and programming data of a relatively high access frequency into a word line group having word lines of relatively low physical heights and data of a relatively low access frequency into a word line group having word lines of relatively high physical heights among the word line groups included in each of the memory blocks.

The method may further include adjusting a number of word lines included in the respective word line groups in each of the memory blocks based on the detected access frequency.

The adjusting may include: increasing the number of word lines included in the word line groups of the relatively low physical heights among the word line groups in each of the memory blocks; and decreasing the number of word lines included in the word line groups of the relatively high physical heights among the word line groups in each of the memory blocks.

The adjusting may include: decreasing the number of word lines included in the word line groups of the relatively low physical heights among the word line groups in each of the memory blocks; and increasing the number of word lines included in the word line groups of the relatively high physical heights among the word line groups in each of the memory blocks.

The plurality of word lines of the respective memory blocks may be divided into first to third word line groups the first word line group may include one or more word lines of lowest physical heights and are suitable for storing hot data of access frequencies above a first threshold the third word line group may include one or more word lines of highest physical heights and are suitable for storing cold data of access frequencies under a second threshold smaller than the first threshold, and the second word line group may include one or more word lines of physical heights between the physical heights of word lines of the first and third word line groups and are suitable for storing intermediate data of access frequencies between the first and second thresholds.

The programming may include storing the hot data only in the first group of the respective memory blocks during a program operation, and may further include merging the stored hot data into a predetermined one among the memory blocks after the program operation.

The programming may include storing the hot data in the first group, the intermediate data in the second group, and the cold data in the third group of the respective memory blocks during a program operation, and may further include merging the stored hot data into a predetermined first memory block, the stored intermediate data into a predetermined second memory block, and the stored cold data into a predetermined third memory block after the program operation.

The programming may include, when K intermediate data and K+L cold data are applied from the host during a program operation, storing the K intermediate data and K cold data in the second and third groups of K memory blocks and L cold data in the second and third groups of rounded-off L/2 memory blocks among the memory blocks, and may further include merging the K stored intermediate data into a first memory block and the K+L stored cold data into a predetermined second memory block after the program operation.

The programming may include controlling the memory system to program the hot data with a first initial program pulse having a lowest voltage level, the cold data with a second initial program pulse having a highest voltage level, and the intermediate data with a third initial program pulse having a voltage level between the first and second initial program pulses.

The data of the relatively high access frequency may include a predetermined number of random data having logic addresses irrelevant to one another and small size data whose size is less than a first size, and the data of the relatively low access frequency may include a predetermined number of sequential data having logic addresses related to one another and big size data whose size is greater than a second size greater than the first size.

DETAILED DESCRIPTION

Figure 1:
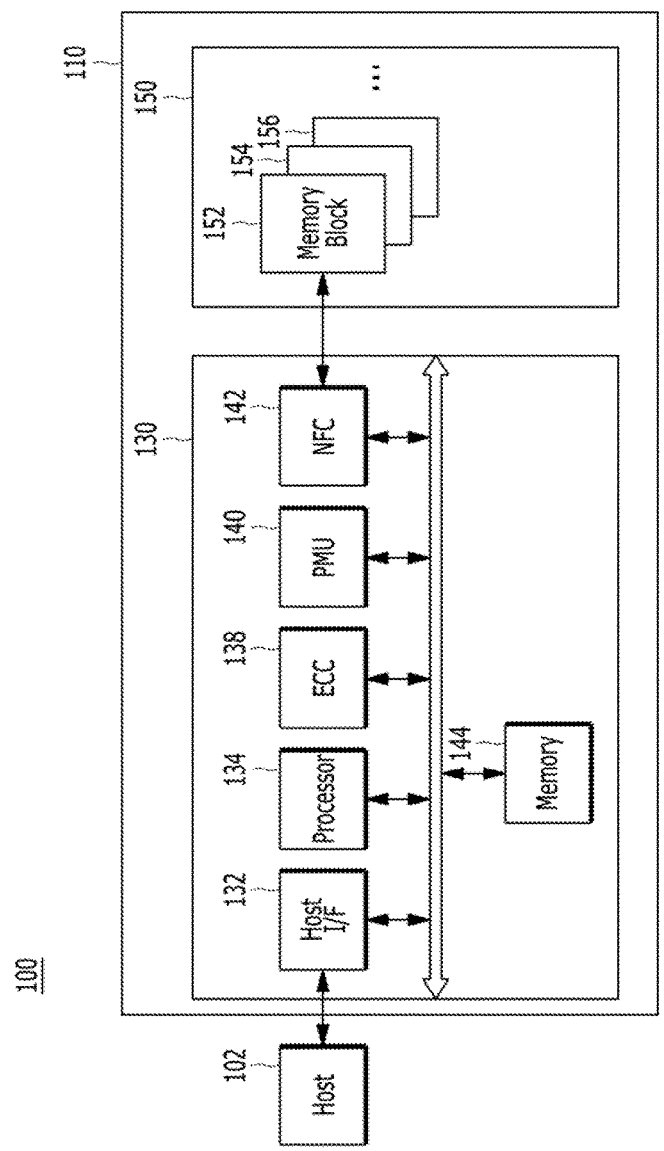
FIG. 1 is a block diagram illustrating a data processing system including a memory system in accordance with an embodiment of the present invention.

Various embodiments of the present invention are described below in more detail with reference to the accompanying drawings. We note, however, that the present invention may be embodied in different other embodiments, forms and variations thereof and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to clearly illustrate various features of the embodiments.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention. As used herein, singular forms are intended to include the plural forms as well, unless the context clearly indicates otherwise. It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

Hereinafter, the various embodiments of the present invention will be described in detail with reference to the attached drawings.

FIG. 1 is a block diagram illustrating a data processing system 100 including a memory system 110 in accordance with an embodiment of the present invention.

Referring to FIG. 1, the data processing system 100 may include a host 102 and the memory system 110.

The host 102 may include portable electronic devices such as a mobile phone, MP3 player and laptop computer or non-portable electronic devices such as a desktop computer, game machine, TV and projector.

The host 102 may include at least one OS (operating system), and the OS may manage and control overall functions and operations of the host 102, and provide an operation between the host 102 and a user using the data processing system 100 or the memory system 110. The OS may support functions and operations corresponding to the use purpose and usage of a user. For example, the OS may be divided into a general OS and a mobile OS, depending on the mobility of the host 102. The general OS may be divided into a personal OS and an enterprise OS, depending on the environment of a user. For example, the personal OS configured to support a function of providing a service to general users may include Windows and Chrome, and the enterprise OS configured to secure and support high performance may include Windows server, Linux and Unix. Furthermore, the mobile OS configured to support a function of providing a mobile service to users and a power saving function of a system may include Android, iOS and Windows Mobile. The host 102 may include a plurality of OSs, and execute an OS to perform an operation corresponding to a user's request on the memory system 110.

The memory system 110 may operate to store data for the host 102 in response to a request of the host 102. Non-limited examples of the memory system 110 may include a solid state drive (SSD), a multi-media card (MMC), a secure digital (SD) card, a universal storage bus (USB) device, a universal flash storage (UFS) device, compact flash (CF) card, a smart media card (SMC), a personal computer memory card international association PCMIA) card and memory stick. The MMC may include an embedded MMC (eMMC), reduced size MMC (RS-MMC) and micro-MMC. The SD card may include a mini-SD card and micro-SD card.

The memory system 110 may be embodied by various types of storage devices. Non-limited examples of storage devices included in the memory system 110 may include volatile memory devices such as a DRAM dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM) and a flash memory. The flash memory may have a 3-dimensional (3D) stack structure.

The memory system 110 may include a memory device 150 and a controller 130. The memory device 150 may store data for the host 120, and the controller 130 may control data storage into the memory device 150.

The controller 130 and the memory device 150 may be integrated into a single semiconductor device, which may be included in the various types of memory systems as exemplified above.

Non-limited application examples of the memory system 110 may include a computer, an Ultra Mobile PC (UMPC), a workstation, a net-book, a Personal Digital Assistant (PDA) a portable computer, a web tablet, a tablet computer, a wireless phone, a mobile phone, a smart phone, an e-book, a Portable Multimedia Mayer (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device and may retain data stored therein even though power is not supplied. The memory device 150 may store data provided from the host 102 through a write operation, and provide data stored therein to the host 102 through a read operation. The memory device 150 may include a plurality of memory dies (not shown), each memory die including a plurality of planes (not shown), each plane including a plurality of memory blocks 152 to 156, each of the memory blocks 152 to 156 may include a plurality of pages, and each of the pages may include a plurality of memory cells coupled to a word line, The controller 130 may control the memory device 150 in response to a request from the host 102. For example, the controller 130 may provide data read from the memory device 150 to the host 102, and store data provided from the host 102 into the memory device 150. For this operation, the controller 130 may control read, write program and erase operations of the memory device 150.

The controller 130 may include a host interface (I/F) unit 132, a processor 134, an error correction code (ECC) unit 138, a Power Management Unit (PMU) 140, a memory device controller such as a NAND flash controller (NFC) 142 and a memory 144 all operatively coupled via an internal bus.

The host interface unit 132 may be configured to process a command and data of the host 102, and may communicate with the host 102 through one or more of various interface protocols such as universal serial bus (USB), multi-media card (MMC), peripheral component interconnect-express (PCI-E), small computer system interface (SCSI), serial-attached SCSI (SAS), serial advanced technology attachment (SATA), parallel advanced technology attachment (DATA), enhanced small disk interface (ESDI) and integrated drive electronics (IDE).

The ECC unit 138 may detect and correct an error contained in the data read from the memory device 150. In other words, the ECC unit 138 may perform an error correction decoding process to the data read from the memory device 150 through an ECC code used during an ECC encoding process. According to a result of the error correction decoding process, the ECC unit 138 may output a signal, for example, an error correction success/fail signal. When the number of error bits is more than a threshold value of correctable error bits, the ECC unit 138 may not correct the error bits, and may output an error correction a signal.

The ECC unit 138 may perform error correction through a coded modulation such as Low Density Parity Check (LDPC) code, Bose-Chaudhri-Hocquenghem (BCH) code, turbo code, Reed-Solomon code, convolution code, Recursive Systematic Code (RSC), Trellis-Coded Modulation (TCM) and Block coded modulation (BCM). However, the ECC unit 138 is not limited thereto. The ECC unit 138 may include all circuits, modules, systems or devices for error correction.

The PM 140 140 may provide and manage power of the controller 130.

The memory device controller 142 may serve as a memory/storage interface for interfacing the controller 130 and the memory device 150 such that the controller 130 controls the memory device 150 in response to a request from the host 102. When the memory device 150 is a flash memory or specifically a NAND flash memory, the memory device controller 142 may be an NFC and may generate a control signal for the memory device 50 and process data to be provided to the memory device 150 under the control of the processor 134. The memory device controller 142 may work as an interface (e.g., a NAND flash interface) for processing a command and data between the controller 130 and the memory device 150. Specifically, the memory device controller 142 may support data transfer between the controller 130 and the memory device 150.

The memory 144 may serve as a working memory of the memory system 110 and the controller 130, and store data for driving the memory system 110 and the controller 130. The controller 130 may control the memory device 150 to perform read, write, program and erase operations in response to a request from the host 102. The controller 130 may provide data read from the memory device 150 to the host 102, may store data provided from the host 102 into the memory device 150. The memory 144 may store data required for the controller 130 and the memory device 150 to perform these operations.

The memory 144 may be embodied by a volatile memory. For example, the memory 144 may be embodied by static random access memory (SRAM) or dynamic random access memory (DRAM). The memory 144 may be disposed within or out of the controller 130. FIG. 1 exemplifies the memory 144 disposed within the controller 130. In an embodiment, the memory 144 may be embodied by an external volatile memory having a memory interface transferring data between the memory 144 and the controller 130.

The processor 134 may control the overall operations of the memory system 110. The processor 134 may drive firmware to control the overall operations of the memory system 110. The firmware may be referred to as flash translation layer (FTL).

The processor 134 of the controller 130 may include a management unit (not illustrated) for performing a bad management operation of the memory device 150. The management unit may perform a bad block management operation of checking a bad block, in which a program fail occurs due to the characteristic of a NAND flash memory during a program operation, among the plurality of memory blocks 152 to 156 included in the memory device 150. The management unit may write the program-failed data of the bad block to a new memory block. In the memory device 150 having a 3D stack structure, the bad block management operation may reduce the use efficiency of the memory device 150 and the reliability of the memory system 110. Thus, the bad block management operation needs to be performed with more reliability.

Figure 2:
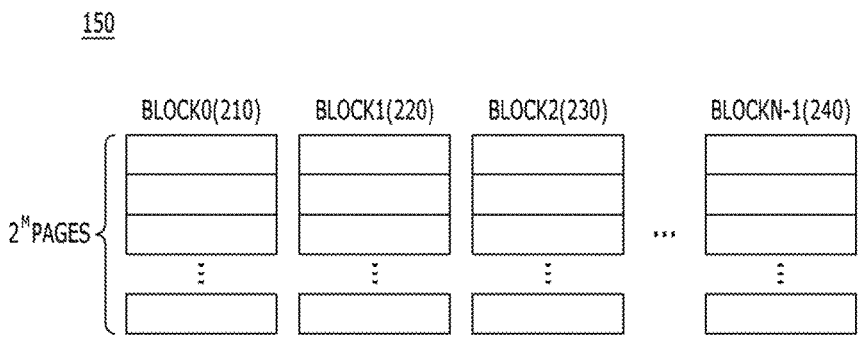
FIG. 2 is a schematic diagram illustrating an exemplary configuration of a memory device employed in the memory system shown in FIG. 1.

FIG. 2 is a schematic diagram illustrating the memory device 150.

Referring to FIG. 2 the memory device 150 may include a plurality of memory blocks 0 to N−1 and each of the blocks 0 to N−1 may include a plurality of pages, for example, $2^M$ pages, the number of which may vary according to circuit design. Memory cells included in the respective memory blocks 0 to N−1 may be one or more of a single level cell (SLC) storing 1-bit data, or a multi-level cell (MLC) storing 2—or more bit data. An MLC storing 3-bit data is also referred to as a triple level cell (TLC), and an MLC storing 4-bit data is also referred to as a quadruple level cell (QLC).

Figure 3:
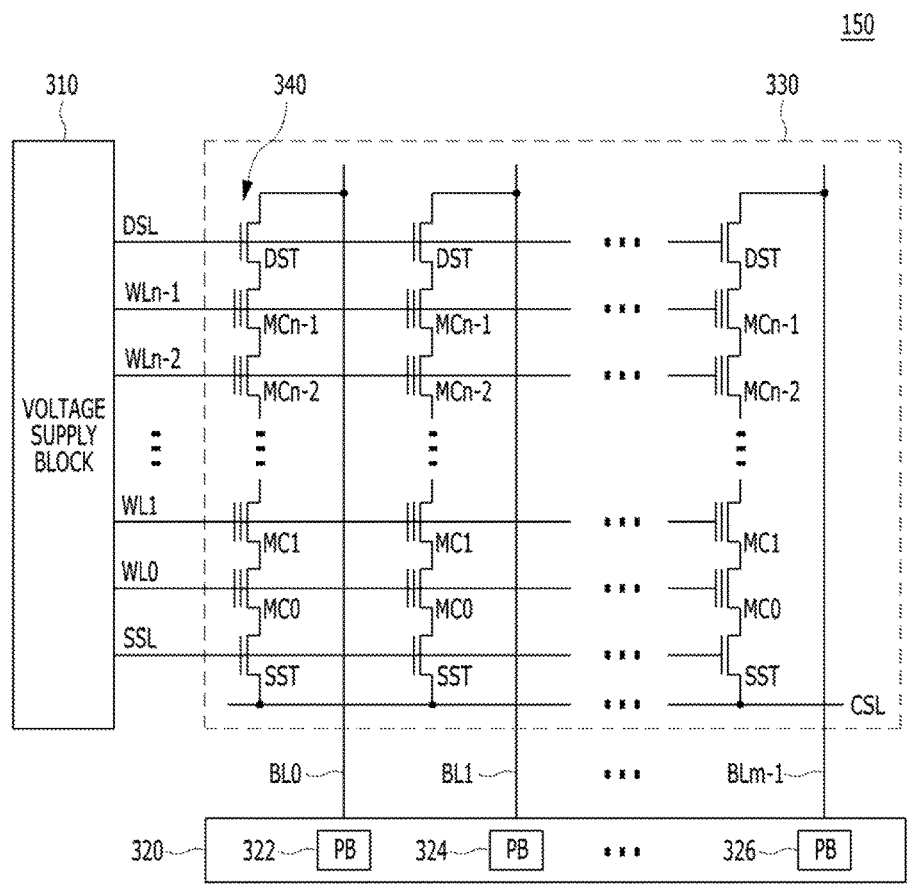
FIG. 3 is a circuit diagram illustrating an exemplary configuration of a memory cell array of a memory block in the memory device shown in FIG. 2.

FIG. 3 is a circuit diagram illustrating an exemplary configuration of a memory cell array of a memory block in the memory device 150.

Referring to FIG. 3, a memory block 330 which may correspond to any of the plurality of memory blocks 152 to 156 included in the memory device 150 of the memory system 110 may include a plurality of cell strings 340 coupled to a plurality of corresponding bit lines BL0 to BLm−1. The cell string 340 of each column may include one or more drain select transistors DST and one or more source select transistors SST. Between the drain and source select transistors DST and SST, a plurality of memory cells MC0 to MCn−1 may be coupled in series. In an embodiment, each of the memory cell transistors MC0 to MCn−1 may be embodied by an MLC capable of storing data information of a plurality of bits. Each of the cell strings 340 may be electrically coupled to a corresponding bit line among the plurality of bit lines BL0 to BLm-1. For example, as illustrated in FIG. 3, the first cell string is coupled to the first bit line BL0, and the last cell string is coupled to the last bit line BLm-1.

Although FIG. 3 illustrates NAND flash memory cells, the invention is not limited in this way. It is noted that the memory cells may be NOR flash memory cells, or hybrid flash memory cells including two or more kinds of memory cells combined therein. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply unit 310 which provides word line voltages including a program voltage, a read voltage and a pass voltage to supply to the word lines according to an operation mode. The voltage generation operation of the voltage supply unit 310 may be controlled by a control circuit (not illustrated). Under the control of the control circuit, the voltage supply unit 310 may select one of the memory blocks (or sectors) of the memory cell array, select one of the word lines of the selected memory block, and provide the word line voltages to the selected word line and the unselected word lines as may be needed.

The memory device 150 may include a read/write circuit 320 which is controlled by the control circuit. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs), and each of the page buffers 322 to 326 may include a plurality of latches (not illustrated).

Figure 4:
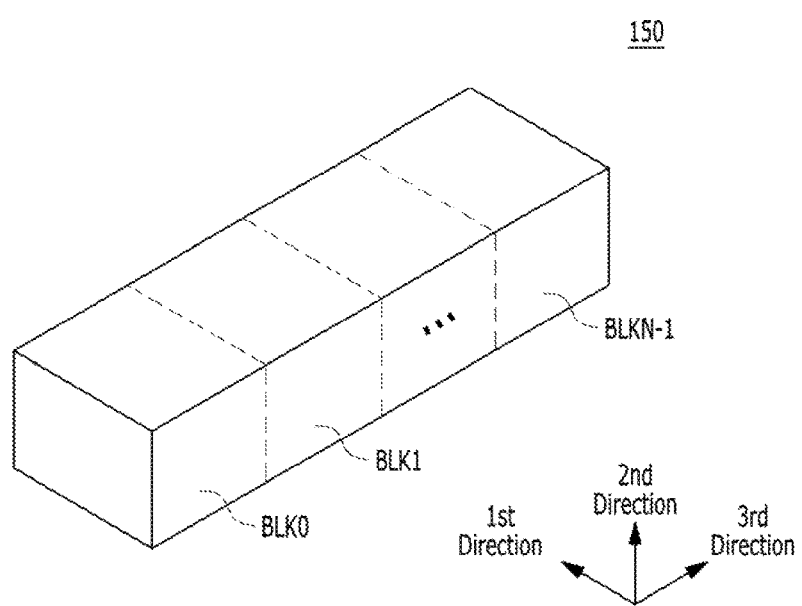
FIGS. 4 and 5 are diagrams illustrating an exemplary 3D structure of a memory device shown in FIG. 2.
Figure 5:
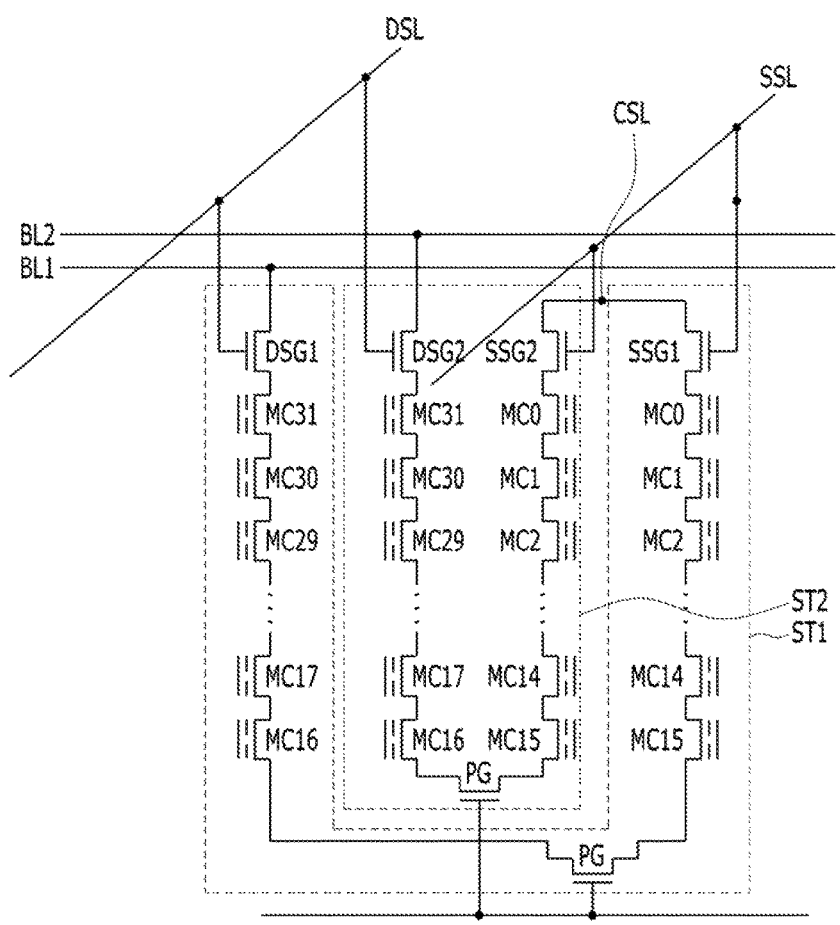

FIGS. 4 and 5 are diagrams illustrating an exemplary 3D structure of the memory device 150.

Referring to FIG. 4, the memory device 150 may include a plurality of memory blocks BLK1 to BLKH, as described above. FIG. 4 is a perspective view of memory blocks of the memory device 150 shown in FIG. 3. Each memory block BLK may be realized in a three-dimensional structure (or a vertical structure), For example, each memory block BLK may include structures that are extended in first to third direction, e.g., x-axis direction, y-axis direction, and z-axis direction.

Each memory block BLK may include a plurality of NAND strings NS that are extended in the second direction. Also, a plurality of NAND strings NS may be extended in the first direction and the third direction. Each of the NAND strings NS may be coupled to a bit line BL, at least one source selection line SSL, at least one drain selection line DSL, a plurality of word lines WL, at least one dummy word line DWL, and a common source line CSL. In other words, each memory block BLK may be coupled to a plurality of bit lines BL, a plurality of source selection lines SSL, a plurality of drain selection lines DSL, a plurality of word lines WL, a plurality of dummy word lines DWL, and a plurality of common source lines CSL.

Referring to FIG. 5, there is a circuit diagram illustrating an arbitrary memory block BLKj of the three-dimensional structure shown in FIG. 4, where one cell string is formed as one upper string and one lower string coupled to each other through a pipe gate PG. Also, FIG. 5 shows an arbitrary memory block BLKj including a pair of a first string ST1 and a second string ST2.

To be specific, in the arbitrary memory block BLKj, memory cells that are stacked along a first channel, such as at least one source selection gate and at least one drain selection gate, may form the first string ST1; and memory cells that are stacked along a second channel, such as at least one source selection gate and at least one drain selection gate, may form the second string ST2.

Also, the first string ST1 and the second string ST2 may be coupled to the same drain selection line DSL and the same source selection line SSL. Also, the first string ST1 may be coupled to a first bit line BL1, and the second string ST2 may be coupled to a second bit line BL2.

Also, memory cells of the same height of the NAND strings ST1 and ST2 of the same row may share a word line. In other words, at the same height, word lines coupled to the memory cells of NAND strings ST1 and ST2 may be commonly coupled to a single word line. For example, memory cells MC0 and MC31 of the first string ST1 and memory cells MC0 and MC31 of the second string ST2 may be commonly coupled to a single word line.

Therefore, since the memory cells have different heights, word lines respectively coupling memory cells of different heights also have different heights.

The different heights of the word lines and memory cells may cause difference in characteristics among the memory cells of different heights.

The memory cells of lower physical height may have thinner oxide layers and shorter gates, which may cause faster program operation thereto.

For example, a faster program operation may be performed to the memory cells MC15 and MC16 having lower physical heights in the first and second strings ST1 and ST2.

Figure 6:
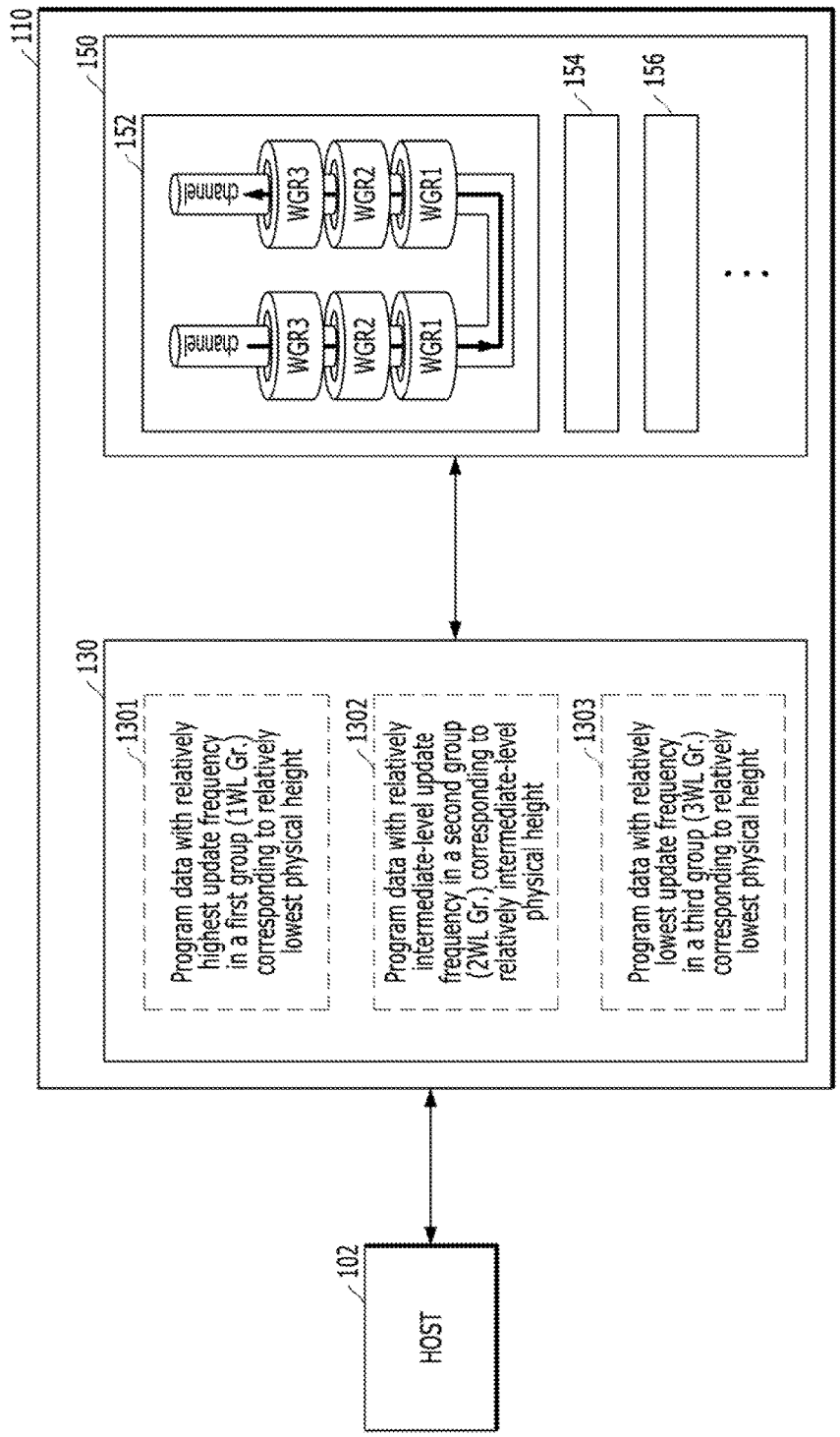
FIG. 6 is a schematic diagram illustrating a program operation to the memory block shown in FIGS. 4 and 5 in accordance with an embodiment of the present invention.

FIG. 6 is a schematic diagram illustrating a program operation to the memory block shown in FIGS. 4 and 5 in accordance with an embodiment of the present invention.

Referring to FIG. 6, each of the 3D memory blocks 152 to 156 may include a plurality of memory cells and word lines of different heights.

The word lines of each of the memory blocks 152 to 156 may be divided into a predetermined number of groups WGR1, WGR2 and WGR3 according to the physical height of the word lines. For example, in the first memory block 152, the word lines may be divided into a first group WGR1 corresponding to the lowest physical heights, a second group WGR2 corresponding to the intermediate physical heights, and a third group WGR3 corresponding to the highest physical heights.

In this disclosure, the word line groups WGR1 to WGR3 will represent storage spaces (e.g., memory cells) respectively coupled thereto in the respective memory blocks 152 to 156.

The controller 130 may program data with highest access frequencies into the word line group of the lowest physical heights (i.e., the first group WGR1), and program data with lowest access frequencies into the word line group of the highest physical heights (i.e., the third group WGR3). The controller 130 may program data with intermediate access frequencies into the word line group of the intermediate physical heights (i.e., the second group WGR2).

Herein, the access frequency of each data may be detected from the logic address and data size of each data.

For example, the data with the highest access frequencies may include hot frequency data that are frequently requested more than a first reference frequency number, a predetermined number of random data having logic addresses irrelevant to one another and small size data whose size is less than a first size, which will be representatively referred to as hot data hereafter.

Also, the data with intermediate access frequencies may include intermediate frequency data that are requested a number of times between the first reference frequency number and a second reference frequency number, which is smaller than the first reference frequency number, and intermediate size data whose size falls between the first size and a second size, which is greater than the first size, which will be representatively referred to as intermediate data hereafter.

Also the data with lowest access frequencies may include cold frequency data that are frequently requested a number of times smaller than the second reference frequency number, a predetermined number of sequential data having logic addresses related to one another and big size data whose size is greater than the second size, which will be representatively referred to as cold data hereafter. In addition, such data as 'journal data', 'reliable data', and 'force flush data' may be included in the cold data.

Herein, the first and second reference frequency numbers and the first and second sizes may vary according to a system design.

Figure 7:
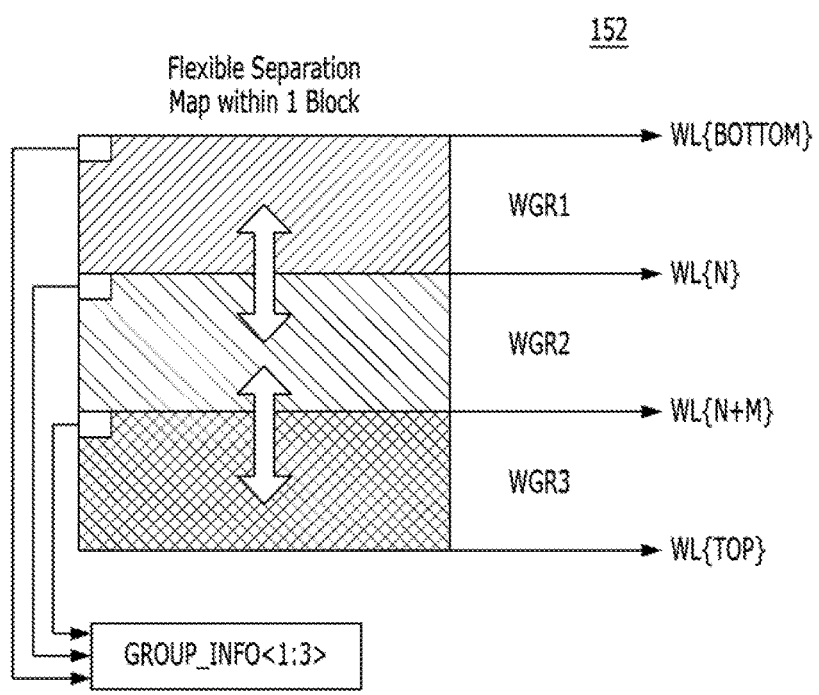
FIG. 7 is a schematic diagram illustrating in further detail the program operation of the memory system shown in FIG. 6 in accordance with an embodiment of the present invention.

FIG. 7 is a schematic diagram illustrating the program operation of the memory system 110 in accordance with the embodiment of the present invention.

Referring to FIG. 7, the controller 130 may detect the access frequency of each data to be programmed from the logic address and data size of each to-be-programmed data.

The controller 130 may control the number of the word lines in the respective groups WGR1, WGR2 and WGGR3 of each of the memory blocks 152 to 156 based on the access frequency detection result. For example, as shown in FIG. 7, the controller 130 may group N word lines from a word line WL{BOTTOM} of the lowest physical height to a word line WL{N} into the first group WGR1, group M word lines from a word line{N+1} to a word line WL{N+M} into the second group WGR2, and group remaining word lines from a word line {N+M+1} to a word line WL{TOP} of the highest physical height into the third group WGR3 among the word lines WL{BOTTOM} to WL{TOP} included in each of the memory blocks 152 to 156, where N and M are natural numbers greater than '1'.

In operation, when there is more data with a relatively high access frequency than data with a relatively low access frequency during a program operation as a result of the access frequency detection of the to-be-programmed data, the controller 130 may increase the N and M numbers of the word lines respectively included in the first and second groups WGR1 and WGR2 thereby decreasing the number of the word lines included in the third group WGR3.

Conversely, when there is more data with a relatively low access frequency than data with a relatively high access frequency during a program operation as a result of the access frequency detection of the to-be-programmed data the controller 130 may decrease the N and M numbers of the word lines respectively included in the first and second groups WGR1 and WGR2 thereby increasing the number of the word lines included in the third group WGR3.

Also, the controller 130 may program metadata GROUP_INFO<1:3> respectively representing numbers of the word lines included in the first to third groups WGR1 to WGR3 of each of the memory blocks 152 to 156 in each of the memory blocks 152 to 156 in order to secure the metadata even when a sudden power-off occurs.

In an embodiment, each time the controller 130 programs data into a target word line of the memory blocks 152 to 156, the controller 130 may also program into the target word line a metadata representing to which of the groups WGR1, WGR2 and WGR3 the target word line belongs.

Figure 8:
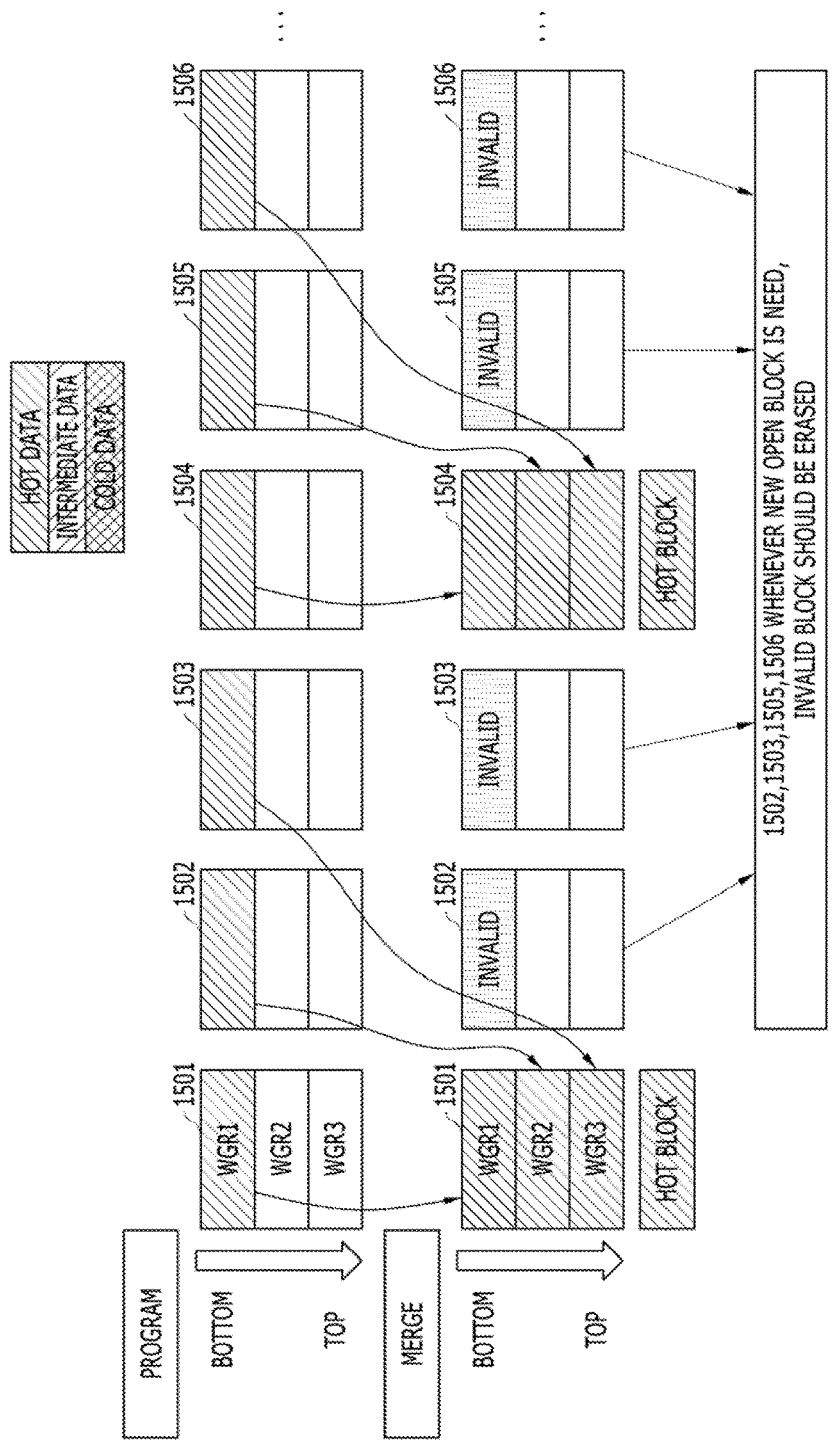
FIGS. 8 and 9 are schematic diagrams exemplifying the program operation of the memory system in accordance with an embodiment of the present invention.
Figure 9:
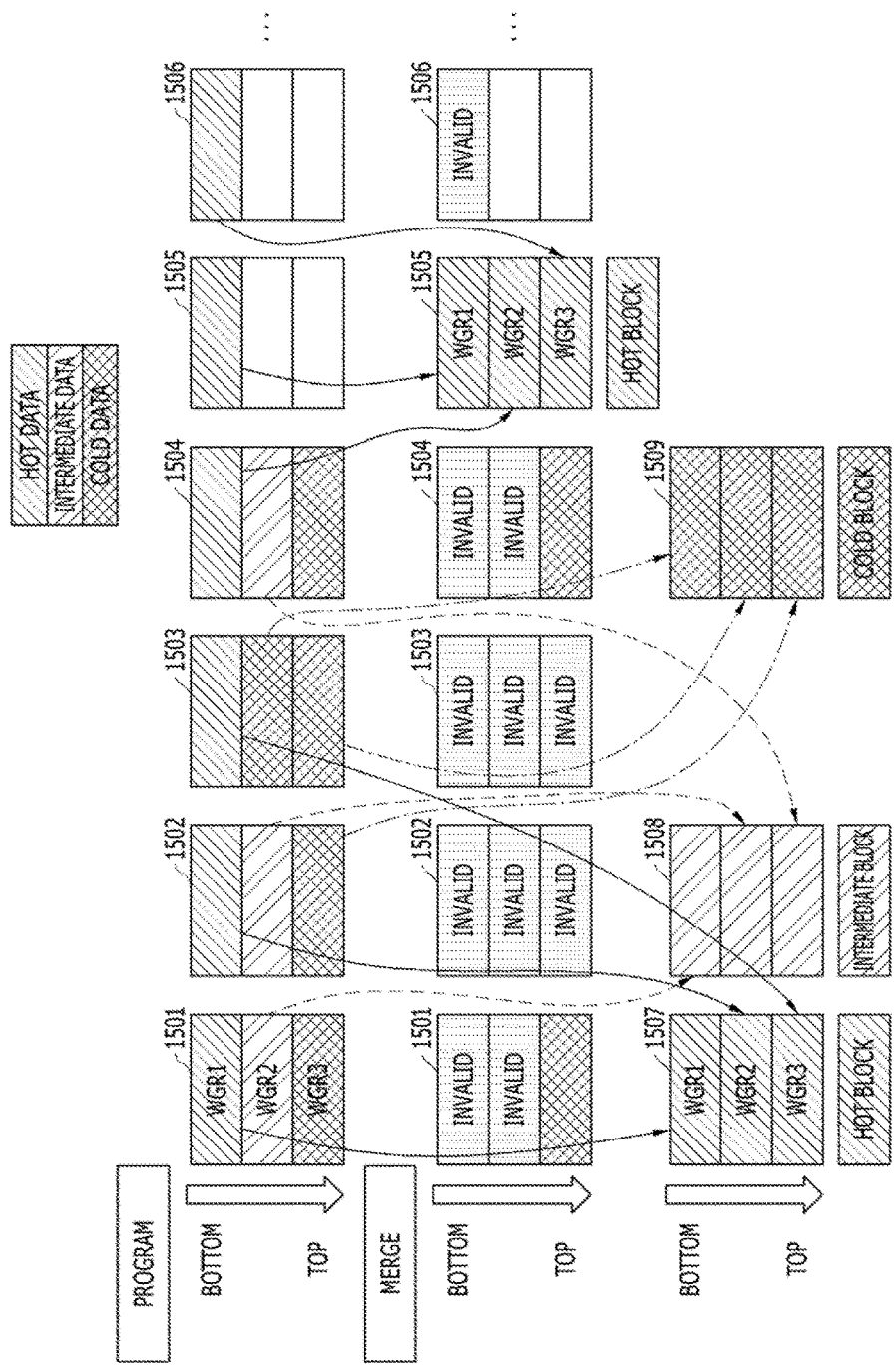

FIGS. 8 and 9 are schematic diagrams exemplifying the program operation of the memory system 100.

FIG. 8 exemplifies the program operation of only hot data HOT DATA consecutively applied from the host 102 to the memory system 110.

When only hot data HOT DATA are applied from the host 102 to the memory system 110 during a program operation, the controller 130 may store the hot data HOT DATA only into the first group WGR1 of each of the memory blocks 1501 to 1506.

Herein, FIG. 8 shows an example where the hot data HOT DATA are stored only in the first groups WGR1 of the memory blocks 1501 to 1506 but this is a mere example. For example, if the number of free blocks is short in the memory device 150 and it becomes impossible to store the hot data HOT DATA only in the first groups WGR1 of the memory blocks 1501 to 1506, some of the hot data HOT DATA, may be stored in the second groups WGr2, and if it also becomes impossible to store the hot data HOT DATA in the second groups WGR2, some of the hot data HOT DATA may be also stored in the third groups WGR3.

During a merge operation after the program operation, the controller 130 may merge the hot data HOT DATA of the first groups WGR1 of the memory blocks 1501 to 1506 into the first to third groups WGR1 and WGR3 of predetermined memory blocks 1501 and 1504, and then set the predetermined memory blocks 1501 and 1504 as hot memory blocks HOT BLOCK.

Then, the controller 130 may invalidate the hot data HOT DATA which remain in the first groups WGR1 of the memory blocks 1501 to 1506 other than the hot memory blocks HOT BLOCK.

Herein, the merge operation may be performed during a background operation, such as a garbage collection operation, a wear leveling operation, or a read reclaim operation.

The controller 130 may free the memory cells which are coupled to the first groups WGR1 and which store the invalidated hot data when required or immediately after the invalidation of the hot data.

In an embodiment, the memory blocks 152 to 156 may be included in the single memory device 150. In an embodiment the memory blocks 152 to 156 may be included n a plurality of memory devices or memory planes, respectively. In this case, the memory blocks 152 to 156 may form one or more super blocks.

FIG. 9 exemplifies a program operation of hot data, cold data, and intermediate data applied from the host 102 to the memory system 110 in accordance with an embodiment of the present invention.

Further, FIG. 9 exemplifies a case when the number of the cold data is greater than the number of the intermediate data.

In each of the memory blocks 1501 to 1509, the controller 130 may store the hot data HOT DATA in first groups WGR1 the intermediate data INTERMEDIATE DATA in second groups WGR2 and the cold data COLD DATA in third groups WGR3.

When K numbers of the intermediate data INTERMEDIATE DATA and K+L numbers of the cold data COLD DATA are applied from the host 102 during a program operation, the controller 130 may store the K intermediate data INTERMEDIATE DATA in the second groups WGR2 of K memory blocks among the memory blocks 1501 to 1509, and store the K cold data COLD DATA in the third groups WGR3 of the K memory blocks storing the K intermediate data INTERMEDIATE DATA. Also, the controller 130 may distributively store the remaining L cold data COLD DATA in the second and third groups WGR2 and WGR3 of L/2 memory blocks among memory blocks other than the K memory blocks storing the K cold data COLD DATA. Herein, K and L are natural numbers greater than '1', and when the value of L/2 is not a natural number, the value may be rounded off to the nearest natural number.

For example, as shown in FIG. 9, the controller 130 may store six hot data HOT DATA in the first groups WGR1 of six memory blocks 1501 to 1506 among the nine memory blocks 1501 to 1509. Also, the controller 130 may store three intermediate data INTERMEDIATE DATA in three memory blocks 1501, 1502 and 1504 among the nine memory blocks 1501 to 1509. Also, the controller 130 may store first three cold data COLD DATA among the five cold data COLD DATA in the third groups WGR3 of the three memory blocks 1501, 1502 and 1504 having the second groups WGR2 which store the three intermediate data INTERMEDIATE DATA among the nine memory blocks 1501 to 1509 and store the remaining two cold data COLD DATA in the second and third groups WGR2 and WGR3 of one memory block 1503 other than the three memory blocks 1501, 1502 and 1504 which store the first three intermediate data INTERMEDIATE DATA among the nine memory blocks 1501 to 1509.

As described above, when data are applied from the host 102, the controller 130 may store intermediate data INTERMEDIATE DATA in the second groups WGR2 and the cold data COLD DATA in the third groups WGR3 in the respective memory blocks 1501 to 1509. However, in consideration of operation efficiency, the cold data COLD DATA may be distributively stored in the second groups WGR2 and the third groups WGR3 of some blocks among the memory blocks 1501 to 1509. Of course, although not directly illustrated in the drawing, it is also possible to distributively store the intermediate data INTERMEDIATE DATA in the second groups WGR2 and the third groups WGR3 of some blocks among the memory blocks 1501 to 1509. According to an embodiment of the present invention, the controller 130 may program the hot data HOT DATA applied from the host 102 in the first groups WGR1 of the memory blocks 1501 to 1509 with top priority, program the intermediate data INTERMEDIATE DATA in the second groups WGR2 of the memory blocks 1501 to 1509 with top priority, and program the cold data COLD DATA in the third groups WGR3 of the memory blocks 1501 to 1509 with top priority.

During a merge operation after the program operation, the controller 130 may merge the hot data HOT DATA into the first to third groups WGR1 to WGR3 of predetermined first memory blocks 1505 and 1507, and then set the predetermined first memory blocks 1505 and 1507 as hot memory blocks HOT BLOCK.

Then, the controller 130 may invalidate the hot data HOT DATA remained in the first groups WGR1 of the memory blocks 1501 to 1509 other than the hot memory blocks HOT BLOCK.

Also, during the merge operation, the controller 130 may merge the intermediate data INTERMEDIATE DATA into the first to third groups WGR1 to WGR3 of a predetermined second memory block 1508, and then set the predetermined second memory block 1508 as an intermediate memory block INTERMEDIATE BLOCK.

Then, the controller 130 may invalidate the intermediate data INTERMEDIATE DATA remained in the second group WGR2 of the memory blocks 1501 to 1509 other than the intermediate memory blocks INTERMEDIATE BLOCK.

Also, during the merge operation the controller 130 may merge the cold data COLD DATA into the first to third groups WGR1 to WGR3 of a predetermined third memory block 1509, and then set the predetermined third memory block 1509 as a cold memory block COLD BLOCK.

Then, the controller 130 may invalidate the cold data COLD DATA remained in one or more of the second and third groups WGR2 and WGR3 of the memory blocks 1501 to 1509 other than the cold memory block COLD BLOCK.

Herein, the controller 130 may merge the cold data COLD DATA by a unit of 3 data, the number of which correspond to the first to third groups WGR1 to WGR3 of a single memory block. The controller 130 may leave the cold data COLD DATA stored in the memory blocks 1501 to 1509 other than the cold memory block COLD BLOCK without the merge until 3 cold data COLD DATA are programmed into the memory blocks 1501 to 1509 other than the cold memory block COLD BLOCK. As exemplified in FIG. 9, since the number of the cold data COLD DATA is '5', first three cold data COLD DATA that are respectively stored in the third group WGR3 of the second memory block 1502 and the second group WGR2 and the third group WGR3 of the third memory block 1503 are merged in the predetermined third memory block 1509 while the remaining two cold data COLD DATA are left stored in the third group WGR3 of the first memory block 1501 and the third group WGR3 of the fourth memory block 1504 without merge until one more cold data COLD DATA is programmed into the memory blocks 1501 to 1509 other than the cold memory block COLD BLOCK.

In an embodiment, the controller 130 may also merge the hot data HOT DATA or the intermediate data INTERMEDIATE DATA by a unit of 3 data, as described above with reference to the cold data COLD DATA.

Figure 10A:
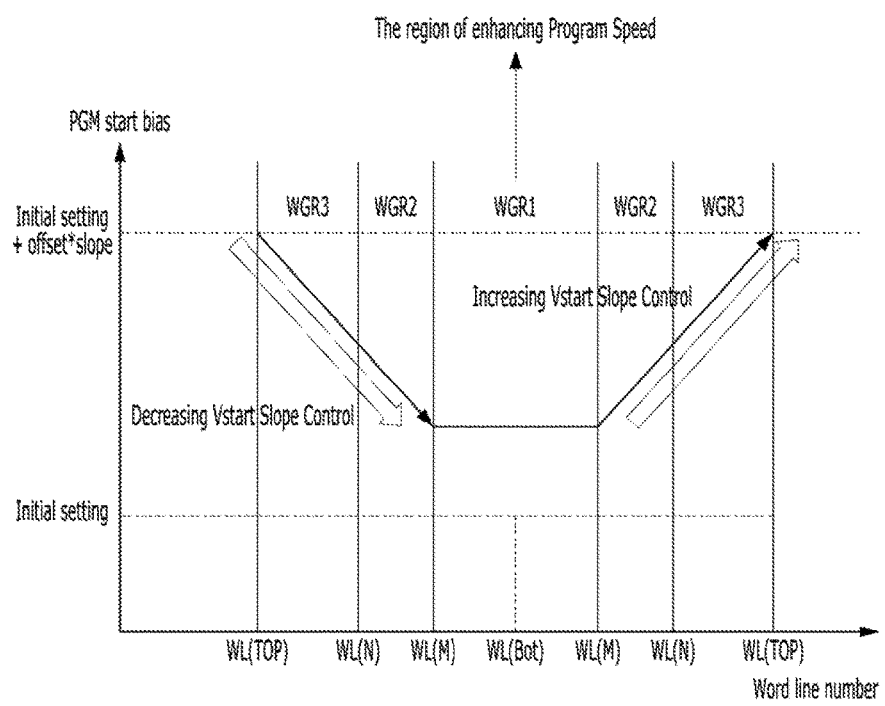
FIG. 10A is a diagram illustrating program voltages applied to each word line group in accordance with an embodiment of the present invention.

FIG. 10A is a diagram illustrating program voltages applied to each of the first to third groups WGR1 to WGR3 in accordance with an embodiment of the present invention.

Referring to FIG. 10A, the controller 130 may apply to the first group WGR1 first program initializing pulses having the lowest voltage levels because the first group WGR1 corresponding to the lowest physical heights has the quickest program operation rates. Also, the controller 130 may apply to the third group WGR3 third program initializing pulses having the highest voltage levels because the third group WGR3 corresponding to the highest physical heights has the slowest program operation rates. Also, the controller 130 may apply to the second group WGR2 second program initializing pulses having voltage levels between the first program initializing pulses and the third program initializing pulses because the second group WGR2 corresponding to the intermediate physical heights has intermediate program operation rates.

Figure 10B:
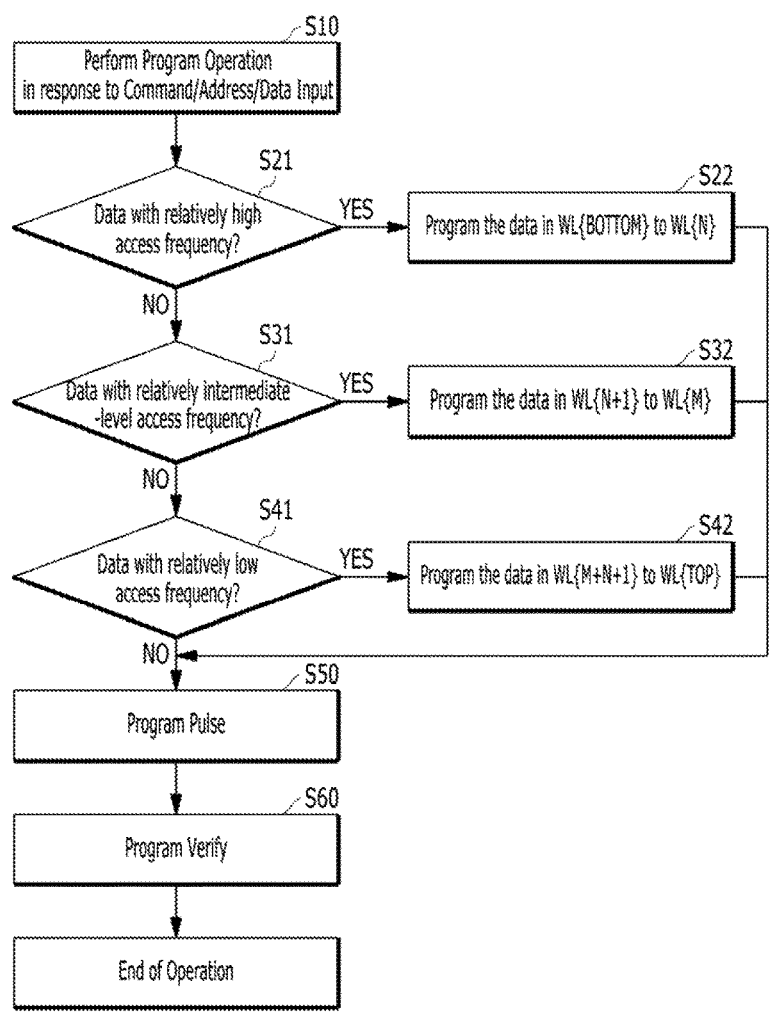
FIG. 10B is a flowchart illustrating the program operation of the memory system in accordance with an embodiment of the present invention.

FIG. 10B is a flowchart illustrating the program operation of the memory system 110 in accordance with the embodiment of the present invention.

Referring to FIG. 10B, in step S10, the memory device 150 may perform a program operation in response to a program command, an address, and data applied from the controller 130.

In steps S21, S31 and S41, the controller 130 may decide whether the data are of the high access frequency, the intermediate access frequency, or the low access frequency. The numbers of word lines in the respective groups WGR1, WGR2 and WGR3 of the respective memory blocks 1501 to 1506 included in the memory device 150 may be predetermined.

Therefore, the memory device 150 may perform a program operation of programming the to-be-programmed data of the decided high access frequency in the word lines WL{BOTTOM} to WL{N} of the first group WGR1 in each of the memory blocks 1501 to 1506 included in the memory device 150 in steps S21, S22, S50 and S60.

Also, the memory device 150 may perform a program operation of programming the to-be-programmed data of the decided intermediate access frequency in the word lines WL{N+1} to WL{N+M} of the second group WGR2 in each of the memory blocks 1501 to 1506 included in the memory device 150 in steps S31, S32, S50 and S60.

Also, the memory device 150 may perform a program operation of programming the to-be-programmed data of the decided low access frequency in the word lines WL{N+M+1} to WL{TOP} of the third group WGR3 in each of the memory blocks 1501 to 1506 included in the memory device 150 in steps S41, S42, S50 and S60.

FIGS. 11 to 19 are diagrams schematically illustrating application examples of the data processing system of FIG. 1, according to various embodiments.

Figure 11:
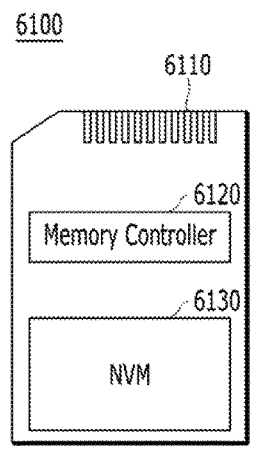
FIGS. 11 to 19 are diagrams schematically illustrating application examples of the data processing system in accordance with various embodiments of the present invention.

FIG. 11 is a diagram schematically illustrating another example of the data processing system including the memory system in accordance with the present embodiment. FIG. 11 schematically illustrates a memory card system to which the memory system in accordance with the present embodiment is applied.

Referring to FIG. 11, the memory card system 6100 may include a memory controller 6120, a memory device 6130 and a connector 6110.

More specifically, the memory controller 6120 may be connected to the memory device 6130 embodied by a nonvolatile memory, and configured to access the memory device 6130. For example, the memory controller 6120 may be configured to control read, write, erase and background operations of the memory device 6130. The memory controller 6120 may be configured to provide an interface between the memory device 6130 and a host, and drive firmware for controlling the memory device 6130. That is, the memory controller 6120 may correspond to the controller 130 of the memory system 110 described with reference to FIGS. 1 to 10B, and the memory device 6130 may correspond to the memory device 150 of the memory system 110 described with reference to FIGS. 1 to 10B.

Thus, the memory controller 6120 may include a RAM, a processing unit, a host interface, a memory interface and an error correction unit. The memory controller 130 may further include the elements shown in FIGS. 1 and 6.

The memory controller 6120 may communicate with an external device, for example, the host 102 of FIG. 1 through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel ATA, small computer system interface (SCSI), enhanced small disk interface (EDSI), Integrated Drive Electronics (IDE), Firewire, universal flash storage (UFS), WIFI and Bluetooth. Thus, the memory system and the data processing system in accordance with the present embodiment may be applied to wired/wireless electronic devices or particularly mobile electronic devices.

The memory device 6130 may be implemented by a nonvolatile memory. For example, the memory device 6130 may be implemented by various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM). The memory device 6130 may include a plurality of dies as in the memory device 150 of FIG. 5.

The memory controller 6120 and the memory device 6130 may be integrated into a single semiconductor device, For example, the memory controller 6120 and the memory device 6130 may construct a solid state driver (SSD) by being integrated into a single semiconductor device. Also, the memory controller 6120 and the memory device 6130 may construct a memory card such as a PC card (PCMCIA: Personal Computer Memory Card International Association), a compact flash (CF) card, a smart media card (e.g., SM and SMC), a memory stick, a multimedia card (e.g., MMC, RS-MMC, MMCmicro and eMMC), an SD card (e.g., SD, miniSD, microSID and SDFIC) and a universal flash storage (UFS).

Figure 12:
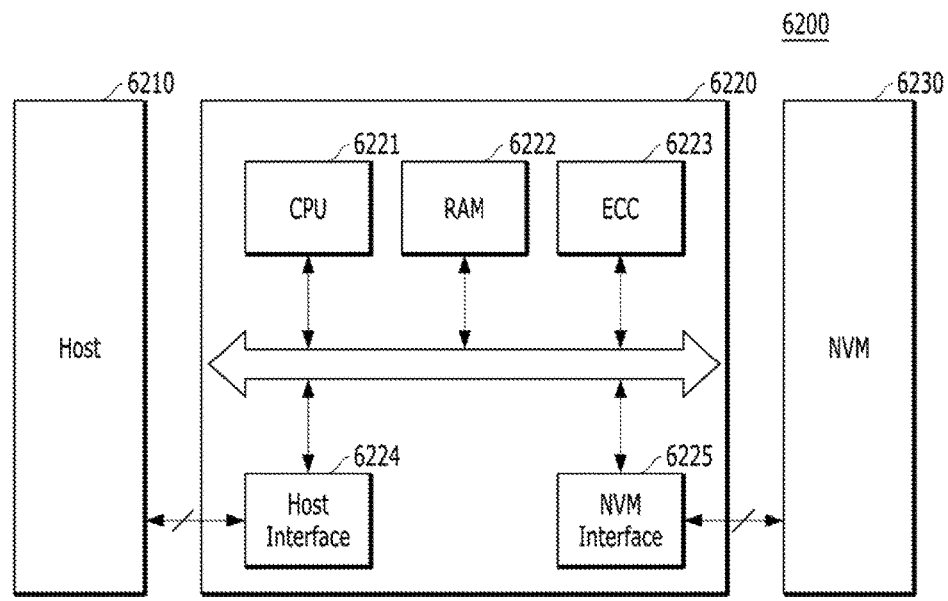

FIG. 12 is a diagram schematically illustrating another example of the data processing system including the memory system in accordance with the present embodiment.

Referring to FIG. 12, the data processing system 6200 may include a memory device 6230 having one or more nonvolatile memories and a memory controller 6220 for controlling the memory device 6230. The data processing system 6200 illustrated in FIG. 12 may serve as a storage medium such as a memory card (CF, SD, micro-SD or the like) or USB device as described with reference to FIG. 1. The memory device 6230 may correspond to the memory device 150 in the memory system 110 illustrated in FIGS. 1 and 6, and the memory controller 6220 may correspond to the controller 130 in the memory system 110 illustrated in FIGS. 1 and 6.

The memory controller 6220 may control a read, write or erase operation on the memory device 6230 in response to a request of the host 6210, and the memory controller 6220 may include one or more CPUs 6221, a buffer memory such as RAM 6222, an ECC circuit 6223, a host interface 6224 and a memory interface such as an NVM interface 6225.

The CPU 6221 may control overall operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the low-speed memory device 6230 to operate at high speed.

The ECC circuit 6223 may correspond to the ECC unit 138 of the controller 130 illustrated in FIG. 1. As described with reference to FIG. 1, the ECC circuit 6223 may generate an ECC (Error Correction Code) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. At this time, the ECC circuit 6223 may correct an error using the parity bit. For example, as described with reference to FIG. 1, the ECC circuit 6223 may correct an error using the LDPC code, BCH code, turbo code, Reed-Solomon code, convolution code, RSC or coded modulation such as TCM or BCM.

The memory controller 6220 may transmit/receive data to/from the host 6210 through the host interface 6224, and transmit/receive data to/from the memory device 6230 through the NVM interface 6225. The host interface 6224 may be connected to the host 6210 through a PATA bus SATA bus, SCSI, USB, PCIe or NAND interface. The memory controller 6220 may have a wireless communication function with a mobile communication protocol such as WiFi or Long Term Evolution (LTE). The memory controller 6220 may be connected to an external device, for example, the host 6210 or another external device, and then transmit/receive data to/from the external device. In particular, as the memory controller 6220 is configured to communicate with the external device through one or more of various communication protocols, the memory system and the data processing system in accordance with the present embodiment may be applied to wired/wireless electronic devices or particularly a mobile electronic device.

Figure 13:
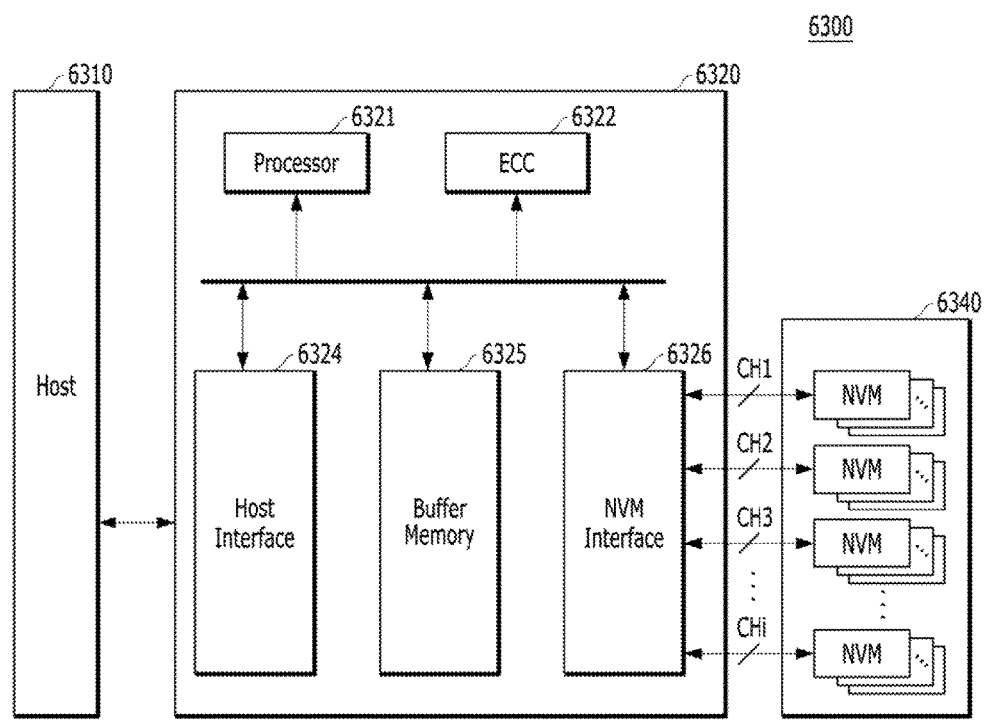

FIG. 13 is a diagram schematically illustrating another example of the data processing system including the memory system in accordance with the present embodiment. FIG. 13 schematically illustrates an SSD to which the memory system in accordance with the present embodiment is applied.

Referring to FIG. 13, the SSD 6300 may include a controller 6320 and a memory device 6340 including a plurality of nonvolatile memories. The controller 6320 may correspond to the controller 130 in the memory system 110 of FIGS. 1 and 6, and the memory device 6340 may correspond to the memory device 150 in the memory system of FIGS. 1 and 6.

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by volatile memories such as DRAM, SDRAM, DDR SDRAM, LPDDR SDRAM and GRAM or nonvolatile memories such as FRAM, ReRAM, STT-MRAM and PRAM. For convenience of description, FIG. 12 illustrates that the buffer memory 6325 exists in the controller 6320. However, the buffer memory 6325 may exist outside the controller 6320.

The ECC circuit 6322 may calculate an ECC value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIGS. 1 and 6 is applied may be provided to embody a data processing system, for example, RAID (Redundant Array of Independent Disks) system. At this time, the RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 14:
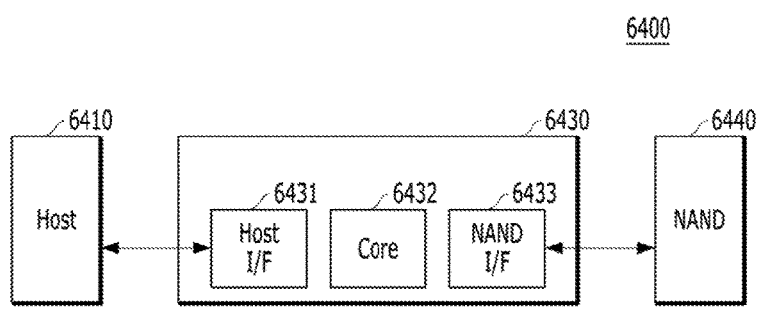

FIG. 14 is a diagram schematically illustrating another example of the data processing system including the memory system in accordance with an embodiment. FIG. 14 schematically illustrates an embedded Multi-Media Card (eMMC) to which the memory system in accordance with an embodiment is applied.

Referring to FIG. 14, the eMMC 6400 may include a controller 6430 and a memory device 6440 embodied by one or more NAND flash memories. The controller 6430 may correspond to the controller 130 in the memory system 110 of FIGS. 1 and 6, and the memory device 6440 may correspond to the memory device 150 in the memory system 110 of FIGS. 1 and 6.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, UHS ((Ultra High Speed)-I/UHS-II) interface.

FIGS. 15 to 18 are diagrams schematically illustrating other examples of the data processing system including the memory system in accordance with an embodiment. FIGS. 15 to 18 schematically illustrate UFS (Universal Flash Storage) systems to which the memory system in accordance with an embodiment is applied.

Referring to FIGS. 15 to 18, the UFS systems 6500, 6600, 6700 and 6800 may include hosts 6510, 6610, 6710 and 6810, UFS devices 6520, 6620, 6720 and 6820 and UFS cards 6530, 6630, 6730 and 6830, respectively. The hosts 6510, 6610, 6710 and 6810 may serve as application processors of wired/wireless electronic devices or particularly mobile electronic devices, the UFS devices 6520, 6620, 6720 and 6820 may serve as embedded UFS devices, and the UFS cards 6530, 6630, 6730 and 6830 may serve as external embedded UFS devices or removable UFS cards.

The hosts 6510, 6610, 6710 and 6810, the UFS devices 6520, 6620, 6720 and 6820 and the UFS cards 6530, 6630, 6730 and 6830 in the respective UFS systems 6500, 6600, 6700 and 6800 may communicate with external devices, for example, wired/wireless electronic devices or particularly mobile electronic devices through UFS protocols, and the UFS devices 6520, 6620, 6720 and 6820 and the UFS cards 6530, 6630, 6730 and 6830 may be embodied by the memory system 110 illustrated in FIGS. 1 and 6. For example, in the UFS systems 6500, 6600, 6700 and 6800, the UFS devices 6520, 6620, 6720 and 6820 may be embodied in the form of the data processing system 6200, the SSD 6300 or the emmC 6400 described with reference to FIGS. 12 to 14, and the UFS cards 6530, 6630, 6730 and 6830 may be embodied in the form of the memory card system 6100 described with reference to FIG. 11.

Furthermore, in the UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720 and 6820 and the UFS cards 6530, 6630, 6730 and 6830 may communicate with each other through various protocols other than the UFS protocol, for example, UFDs, MMC, SD, mini-SD, and micro-SD.

Figure 15:
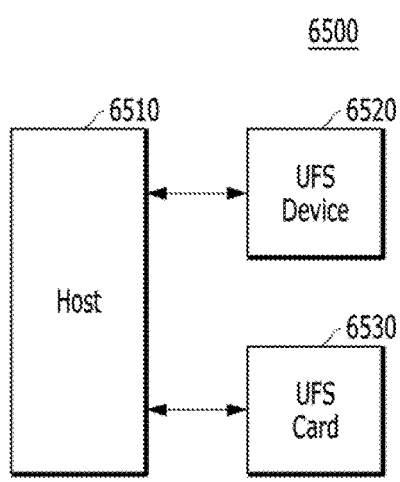

In the UFS system 6500 illustrated in FIG. 15, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. At this time, the UFS device 6520 and the UFS card 6530 may communicate with each other through link layer switching at the UniPro of the host 6510. In the present embodiment, the configuration in which one UFS device 6520 and one UFS card 6530 are connected to the host 6510 has been exemplified for convenience of description. However, a plurality of UFS devices and UFS cards may be connected in parallel or in the form of a star to the host 6410, and a plurality of UFS cards may be connected in parallel or in the form of a star to the UFS device 6520 or connected in series or in the form of a chain to the UFS device 6520.

Figure 16:
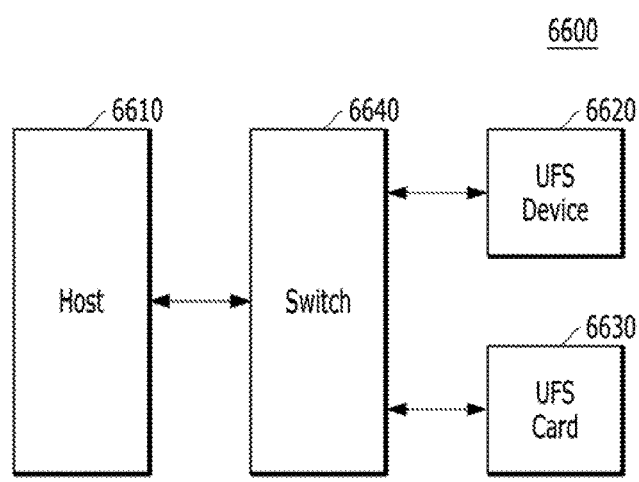

In the UFS system 6600 illustrated in FIG. 16, each of the host 6610, the UFS device 6620 and the UFS card 6630 may include UniPro and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the present embodiment, the configuration in which one UFS device 6620 and one UFS card 6630 are connected to the switching module 6640 has been exemplified for convenience of description. However, a plurality of UFS devices and UFS cards may be connected in parallel or in the form of a star to the switching module 6640, and a plurality of UFS cards may be connected in series or in the form of a chain to the UFS device 6620.

Figure 17:
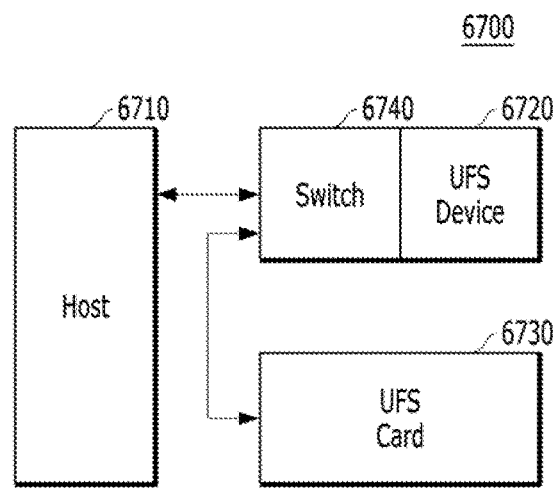

In the UFS system 6700 illustrated in FIG. 17, each of the host 6710, the UFS device 6720 and the UFS card 6730 may include UniPro, and the host 6710 may communicate with the UFS device 6720 or the UFS card 6730 through a switching module 6740 performing a switching operation, for example, through the switching module 6740 which performs link layer switching at the UniPro, for example, L3 switching. At this time, the UFS device 6720 and the UFS card 6730 may communicate with each other through link layer switching of the switching module 6740 at the UniPro, and the switching module 6740 may be integrated as one module with the UFS device 6720 inside or outside the UFS device 6720. In the present embodiment the configuration in which one UFS device 6720 and one UFS card 6730 are connected to the switching module 6740 has been exemplified for convenience of description. However, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 18:
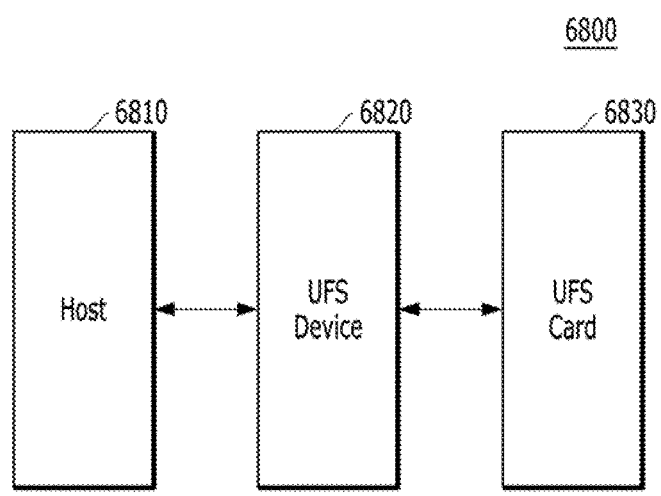

In the UFS system 6800 illustrated in FIG. 18, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target ID (Identifier) switching operation. At this time, the host 6810 and the UFS card 6830 may communicate with each other through target ID switching between the M-PHY and UniPro modules of the UFS device 6820. In the present embodiment, the configuration in which one UFS device 6820 is connected to the host 6810 and one UFS card 6830 is connected to the UFS device 6820 has been exemplified for convenience of description. However, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 19:
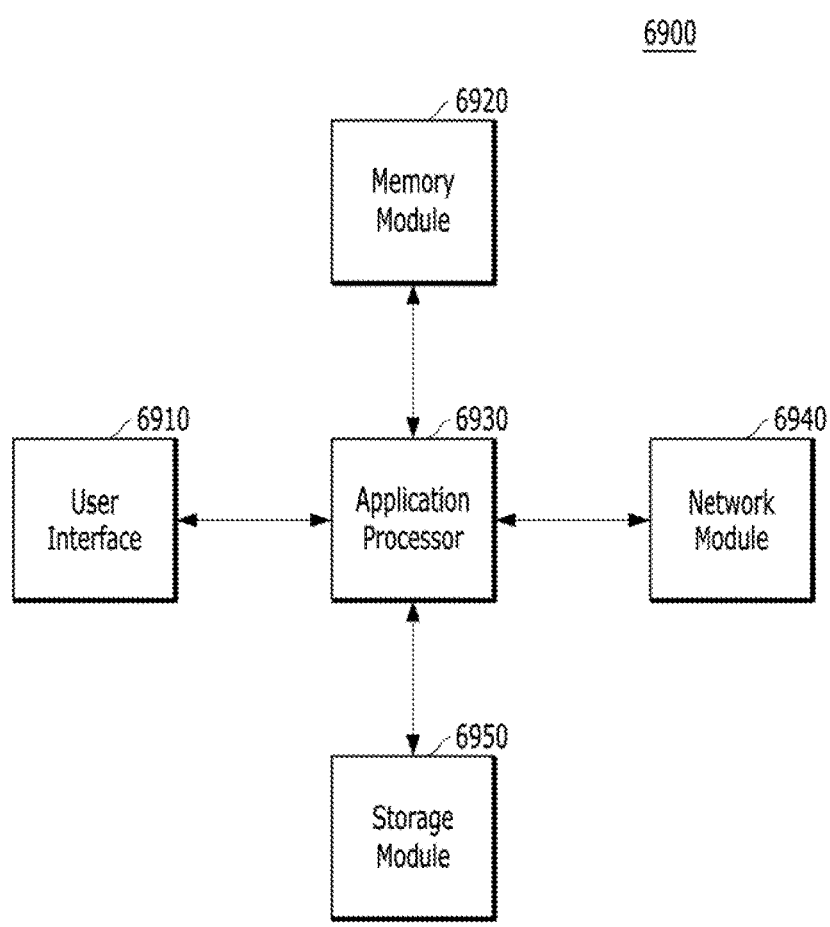

FIG. 19 is a diagram schematically illustrating another example of the data processing system including the memory system in accordance with an embodiment. FIG. 19 is a diagram schematically illustrating a user system to which the memory system in accordance with an embodiment is applied.

Referring to FIG. 19, the user system 6900 may include an application processor 6930, a memory module 6920, a network module 6940, a storage module 6950 and a user interface 6910.

More specifically, the application processor 6930 may drive components included in the user system 6900, for example, an OS, and include controllers interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile RAM such as DRAM, SDRAM, DDR SDRAM, DDR2 SDRAM, DDR3 SDRAM, LPDDR SDARM, LPDDR3 SDRAM or LPDDR3 SDRAM or a nonvolatile RAM such as PRAM, ReRAM, MRAM or FRAM. For example, the application processor 6930 and the memory module 6920 may be packaged and mounted, based on POP (Package on Package).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices or particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, NOR flash and 3D NAND flash, and provided as a removable storage medium such as a memory card or external drive of the user system 6900. The storage module 6950 may correspond to the memory system 110 described with reference to FIGS. 1 and 6. Furthermore, the storage module 6950 may be embodied as an SSD, eMMC and UFS as described above with reference to FIGS. 13 to 18.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED a speaker and a motor.

Furthermore when the memory system 110 of FIGS. 1 and 6 is applied to a mobile electronic device of the user system 6900, the application processor 6930 may control overall operations of the mobile electronic device, and the network module 6940 may serve as a communication module for controlling wired/wireless communication with an external device. The user interface 6910 may display data processed by the processor 6930 on a display/touch module of the mobile electronic device, or support a function of receiving data from the touch panel.

According to various embodiments of the present invention, a memory device is provided which includes a plurality of memory blocks each of which includes a plurality of word lines having a physically stacked structure. Word lines of relatively low physical heights, i.e., word lines having relatively quick program operation rates, are programmed with frequently accessed data. Word lines of relatively high physical heights, i.e., word lines having relatively slow program operation rates are programmed with data that are accessed relatively less frequently.

While the present invention has been described with respect to specific embodiments, it will be apparent to those skilled in the art that various changes and modifications may be made without departing from the spirit and scope of the invention as defined in the following claims.

What is claimed is:

1. A memory system, comprising:
a memory device including a plurality of memory blocks each including a plurality of stacked word lines; and
a controller suitable for dividing the plurality of word lines into two or more word line groups according to heights thereof, programming data of a relatively high access frequency into a word line group having word lines of relatively low physical heights and data of a relatively low access frequency into a word line group having word lines of relatively high physical heights among the word line groups included in each of the memory blocks.

2. The memory system of claim 1,
wherein the controller detects an access frequency of data based on a logic address and a data size of the data, and
wherein the controller adjusts a number of word lines included in the respective word line groups in each of the memory blocks based on the detected access frequency.

3. The memory system of claim 2, wherein the controller increases the number of word lines included in the word line groups of the relatively low physical heights and decreases the number of word lines included in the word line groups of the relatively high physical heights among the word line groups in each of the memory blocks.

4. The memory system of claim 2, wherein the controller decreases the number of word lines included in the word line groups of the relatively low physical heights and increases the number of word lines included in the word line groups of the relatively high physical heights among the word line groups in each of the memory blocks.

5. The memory system of claim 2,
wherein the controller divides the plurality of word lines of the respective memory blocks into first to third word line groups,
wherein the first word line group includes one or more word lines of lowest physical heights and the controller stores hot data of access frequencies above a first threshold,
wherein the third word line group includes one or more word lines of highest physical heights and the controller stores cold data of access frequencies under a second threshold smaller than the first threshold, and
wherein the second word line group includes one or more word lines of physical heights between the physical heights of word lines of the first and third word line groups and the controller stores intermediate data of access frequencies between the first and second thresholds.

6. The memory system of claim 5,
wherein the controller stores the hot data only in the first group of the respective memory blocks during a program operation, and
wherein, during a merge operation after the program operation, the controller merges the stored hot data into a predetermined one among the memory blocks.

7. The memory system of claim 5,
wherein the controller stores the hot data in the first group, the intermediate data in the second group, and the cold data in the third group of the respective memory blocks during a program operation, and
wherein, during a merge operation after the program operation, the controller merges the stored hot data into a predetermined first memory block, the stored intermediate data into a predetermined second memory block, and the stored cold data into a predetermined third memory block.

8. The memory system of claim 5,
wherein when K intermediate data and K+L cold data are applied from the host during a program operation, the controller stores the K intermediate data and K cold data in the second and third groups of K memory blocks and L cold data in the second and third groups of rounded-off L/2 memory blocks among the memory blocks, and
wherein, during a merge operation after the program operation, the controller merges the K stored intermediate data into a first memory block and the K+L stored cold data into a predetermined second memory block.

9. The memory system of claim 5, wherein the controller controls the memory system to program the hot data with a first initial program pulse having a lowest voltage level, the cold data with a second initial program pulse having a highest voltage level, and the intermediate data with a third initial program pulse having a voltage level between the first and second initial program pulses.

10. The memory system of claim 1,
wherein the data of the relatively high access frequency includes a predetermined number of random data having logic addresses irrelevant to one another and small size data whose size is less than a first size, and
wherein the data of the relatively low access frequency includes a predetermined number of sequential data having logic addresses related to one another and big size data whose size is greater than a second size greater than the first size.

11. A method for operating a memory system including a memory device including a plurality of memory blocks each including a plurality of stacked word lines, the method comprising:
detecting an access frequency of data based on a logic address and a data size of the data;
dividing the plurality of word lines into two or more word lire groups according to heights thereof; and
programming data of a relatively high access frequency into a word line group having word lines of relatively low physical heights and data of a relatively low access frequency into a word line group having word lines of relatively high physical heights among the word line groups included in each of the memory blocks.

12. The method of claim 11, further comprising adjusting a number of word lines included in the respective word line groups in each of the memory blocks based on the detected access frequency.

13. The method of claim 12, wherein the adjusting includes:
increasing the number of word lines included in the word line groups of the relatively low physical heights among the word line groups in each of the memory blocks; and
decreasing the number of word lines included in the word line groups of the relatively high physical heights among the word line groups in each of the memory blocks.

14. The method of claim 12, wherein the adjusting includes:
decreasing the number of word lines included in the word line groups of the relatively low physical heights among the word line groups in each of the memory blocks; and
increasing the number of word lines included in the word line groups of the relatively high physical heights among the word line groups in each of the memory blocks.

15. The method of claim 12,
wherein the plurality of word lines of the respective memory blocks are divided into first to third word line groups,
wherein the first word line group includes one or more word lines of lowest physical heights and are suitable for storing hot data of access frequencies above a first threshold,
wherein the third word line group includes one or more word lines of highest physical heights and are suitable for storing cold data of access frequencies under a second threshold smaller than the first threshold and
wherein the second word line group includes one or more word lines of physical heights between the physical heights of word lines of the first and third word line groups and are suitable for storing intermediate data of access frequencies between the first and second thresholds.

16. The method of claim 15,
wherein the programming includes storing the hot data only in the first group of the respective memory blocks during a program operation, and
further comprising merging the stored hot data into a predetermined one among the memory blocks after the program operation.

17. The method of claim 15,
wherein the programming includes storing the hot data in the first group, the intermediate data in the second group, and the cold data in the third group of the respective memory blocks during a program operation, and
further comprising merging the stored hot data into a predetermined first memory block, the stored intermediate data into a predetermined second memory block, and the stored cold data into a predetermined third memory block after the program operation.

18. The method of claim 15,
wherein the programming includes, when K intermediate data and K+L cold data are applied from the host during a program operation, storing the K intermediate data and K cold data in the second and third groups of K memory blocks and L cold data in the second and third groups of rounded-off L/2 memory blocks among the memory blocks, and
further comprising merging the K stored intermediate data into a first memory block and the K+L stored cold data into a predetermined second memory block after the program operation.

19. The method of claim 14, wherein the programming includes controlling the memory system to program the hot data with a first initial program pulse having a lowest voltage level, the cold data with a second initial program pulse having a highest voltage level, and the intermediate data with a third initial program pulse having a voltage level between the first and second initial program pulses.

20. The method of claim 11,
   wherein the data of the relatively high access frequency includes a predetermined number of random data having logic addresses irrelevant to one another and small size data whose size is less than a first size, and
   wherein the data of the relatively low access frequency includes a predetermined number of sequential data having logic addresses related to one another and big size data whose size is greater than a second size greater than the first size.

* * * * *